(12) United States Patent
Tanaka et al.

(10) Patent No.: US 6,376,071 B1
(45) Date of Patent: Apr. 23, 2002

(54) POLYURETHANE FIBER CONTAINING POLY(VINYLIDENE FLUORIDE)

(75) Inventors: Toshihiro Tanaka, Otsu Shiga; Masahi Hara, Kyoto; Masao Umezawa, Shiga, all of (JP)

(73) Assignee: DuPont-Toray Co. Ltd., Tokyo (JP)

(*) Notice: Subject to any disclaimer, the term of this patent is extended or adjusted under 35 U.S.C. 154(b) by 0 days.

(21) Appl. No.: 09/763,418

(22) PCT Filed: Aug. 20, 1999

(86) PCT No.: PCT/US99/19373

§ 371 Date: Feb. 20, 2001

§ 102(e) Date: Feb. 20, 2001

(87) PCT Pub. No.: WO00/11246

PCT Pub. Date: Mar. 2, 2000

(30) Foreign Application Priority Data

Aug. 20, 1998 (JP) .......................... 10/251977

(51) Int. Cl.$^7$ .............. D01F 6/00; D01F 8/00; D01D 5/04

(52) U.S. Cl. ........... 428/364; 428/372; 428/373; 428/394; 264/205; 264/176

(58) Field of Search ................ 428/364, 372, 428/373, 394; 264/205, 176.1

(56) References Cited

U.S. PATENT DOCUMENTS

| | | |
|---|---|---|
| 3,751,520 A | 8/1973 | Yasuda et al. |
| 4,973,647 A | 11/1990 | Bretches et al. |
| 5,539,037 A | 7/1996 | Iqbal |

FOREIGN PATENT DOCUMENTS

| | | |
|---|---|---|
| EP | 0 520 729 | 6/1992 |
| JP | SHO5584413 | 6/1980 |
| JP | 63-60156 | 11/1988 |
| JP | HEISEI 7 82 608 | 3/1995 |

OTHER PUBLICATIONS

Yue M Z et al., Mechanical Properties and Morpholoby of Thermoplastic Polyurethane Elastomer with Pol(Vinylidene Fluoride) Blends; Journals of Applied Polymer Science; vol. 60, No. 4, pp. 597–603; John Wiley & Sons, Inc.; New York Date 1996.

*Primary Examiner*—Newton Edwards

(57) ABSTRACT

The present invention relates to polyurethane based fiber containing 0.1–25 percent poly(vinylidene fluoride) and a method of making the same.

12 Claims, No Drawings

POLYURETHANE FIBER CONTAINING POLY(VINYLIDENE FLUORIDE)

BACKGROUND OF THE INVENTION

1. Field of the Invention

The present invention relates to polyurethane-based fibers and, more particularly, to spandex containing poly(vinylidene fluoride) for improved heat-settability and chemical resistance.

2. Discussion of Related Art

Spandex is widely used in apparel such as hosiery, foundation garments, sportswear.

Japanese Patent Application Publication JP07-082608 discloses poly(tetrafluoroethylene) ("PTFE") as a compounding agent in polyurethane ureas prepared from a mixture of MDI and 2,4'-MDI. However, the elongation and tenacity of the spandex suffer as a result.

U.S. Pat. No. 3,751,520 discloses that the blending of poly(vinylidene fluoride) ("PVDF") into thermoplastic polyurethane reduces the coefficient of friction of molded polyurethane parts.

Japanese Patent JP63-060156 discloses the application of mixtures of PVDF and polyurethane to fabrics to form phase-separated coatings.

According to Japanese Published Patent Application 55-084413, PVDF fibers have been melt-spun with the aid of a polyurethane plasticizer which is extracted after spinning. However, the use of PVDF to improve the properties of spandex has not been disclosed.

Reducing the pressure a wearer may feel from a garment containing spandex is generally accomplished by heat-setting the fabric or garment. In order to speed the heat-setting process and save energy, various methods have been used to improve the heat-set efficiency of the spandex. These include altering the composition of the spandex by using selected chain extenders as disclosed in U.S. Pat. No. 4,973,647, and adding certain compounds to the spandex, as disclosed in U.S. Pat. No. 5,539,037. However, improved resistance to perspiration and heat-set efficiency are still needed for spandex.

SUMMARY OF THE INVENTION

The composition of this invention is a polyurethane-based fiber containing 0.1–25 percent poly(vinylidene fluoride), based on the total weight of polyurethane and PVDF in the fiber.

DETAILED DESCRIPTION OF PREFERRED EMBODIMENTS

As used herein, spandex has its customary meaning, that is, a manufactured fiber in which the fiber-forming substance is a long chain synthetic elastomer comprised of at least 85% by weight of a segmented polyurethane. It has now been discovered that both the resistance to perspiration and heat-set efficiency of polyurethane fibers, generally, and spandex, specifically, are unexpectedly and remarkably improved by adding PVDF into the spandex. It is wholly unexpected that two unrelated characteristics can be improved by a single additive, as is the case here.

In addition, tenacity-at-break, permanent set (which can also be helpful in reducing the pressure experienced by the wearer) and elongation-at-break are also increased. Furthermore, addition of PVDF into the spandex did not result in any observed fibrillation of the inventive fiber, nor was the clarity of the fiber affected. This suggests that little or no phase separation of the polymers occurs.

For the sake of convenience, the invention herein will be discussed in terms of spandex. PVDF is used in the spandex and process of the present invention at levels in the range of 0.1–25 percent by weight of total polymers, that is polyurethane and PVDF. Preferred levels of PVDF are 0.3–15 percent, based on the weight of total polymers in the spandex, with 1–15 weight percent being more preferred.

PVDF suitable for use in the spandex of the present invention is substantially linear, has a number average molecular weight of 300–300,000 as measured by gel permeation chromatography using a polystyrene standard, and has a melt viscosity of 5,000–50,000 poise as measured at a shear rate of 50 sec$^{-1}$ at 240° C. Although PVDF made by either suspension or emulsion polymerization can be used in the present invention, suspension-polymerized PVDF is preferred, because it can form better solutions, with less gel.

The spandex of this invention can be made from a polyurethaneurea derived from a polymeric glycol, a diisocyanate, and at least one diamine and/or at least one aminoalcohol, or from a polyurethane derived from a polymeric glycol, a diisocyanate, and at least one diol.

Polyether glycols, polyester glycols, and polycarbonate glycols are useful in the present invention. Useful polyether glycols include poly(tetramethyleneether glycol ("PO4G"), poly(tetramethyleneether-co-3-methyl-tetramethyleneether) glycol, and poly(tetramethyleneether-co-2,3-dimethyl-tetramethyleneether) glycol. Useful polyester glycols include poly-ε-caprolactone diol and hydroxy-terminated reaction products of diols such as ethylene glycol, 1,3-propane diol, 1,4-butane diol, 1,6-hexane diol, 2,2-dimethyl-1,3-propane diol, 3-methyl-1,5-pentane diol, and mixtures thereof with dicarboxylic acids such as adipic acid, 1,9-nonanedioic acid, and 1,12-dodecanedioic acid. Useful polycarbonate glycols include poly(pentane-1,5-carbonate) diol and poly(hexane-1,6-carbonate) diol. Such glycols have a molecular weight of about 1000–6000, preferably 1500–4500.

Diisocyanates useful in the spandex of the invention include 4-methyl-1,3-phenylene diisocyanate, 1,1'-methylenebis(4-isocyanatobenzene) ("MDI"), 1,4-diisocyanatobenzene, 1,3-diisocyanatoxylene, 1,4-diisocyanatoxylene, 2,6-napthalene diisocyanate, 5-isocyanato-1-(isocyanatomethyl)-1,3,3-trimethylcyclohexane, 1,1'-methylenebis(4-isocyanatocyclohexane), 2,4-diisocyanato-1-methylcyclohexane, 2,6-diisocyanato-1-methylcyclohexane, 1,4-diisocyanatocyclohexane, and mixtures thereof. 1,1'-Methylenebis(4-isocyanatobenzene) is preferred.

Depending on whether a polyurethane or a polyurethaneurea is to be made, the chain extender can be a low molecular weight diamine, aminoalcohol, diol, or mixtures thereof. When diamine(s) or aminoalcohol(s) are used, polyurethaneureas are formed. When diol(s) are used, polyurethanes are formed. Useful diamines include ethylene diamine ("EDA"), 1,2-propane diamine, 1,3-propane diamine, 1,6-hexamethylene diamine, 1,3-xylylenediamine, N-methylbis(3-aminopropyl)amine, 1,4-cyclohexanediamine, 1,3-cyclohexanediamine ("HMPD"), 2-methyl-1,5-pentanediamine, 1,3-pentanediamine, and mixtures thereof. Ethylene diamine, 1,2-propane diamine, 2-methyl-1,5-pentanediamine, 1,3-cyclo-hexanediamine, 1,3-pentanediamine, and mixtures thereof are preferred. Suitable low molecular weight diols include ethylene glycol ("2G"), 1,3-propane diol, 1,2-propane diol, 2,2-dimethyl-1,3-propane diol, 1,4-butane diol, 3-methyl-1,5-pentane diol, 1,6-hexane diol, 1,4-bis(β-hydroxyethoxy)benzene, N-methylbis(2-hydroxypropyl)amine, and mixtures thereof. Ethylene glycol, 1,3-propane diol, and 1,4-butanediol are preferred.

So long as the advantages of the present invention are not diminished, small amounts of ingredients of greater than difunctionality can be used, such as diethylenetriamine.

The polyurethane used in making the spandex has a number average molecular weight of 40,000–150,000 as measured by gel permeation chromatography using a polystyrene standard, and a high-temperature-side melting point of 200°–260° C. as measured on a second cycle by differential scanning calorimetry. In order to control the molecular weight of the polyurethane, small amounts of a monofunctional chain terminator such as diethylamine can be added.

The spandex can contain additives such as stabilizers and pigments, provided such additives do not detract from the benefits of the invention. Among such additives are benzotriazole based stabilizers, ultraviolet light absorbers, other light resistance agents, antioxidants, anti-tack agents, lubricants such as mineral oil and silicone oils, antistatic agents. Other examples of additives include hindered phenolic stabilizers such as 2,6-di-t-butyl-4-methyl-phenol as a light stabilizer, antioxidants such as "Sumilizer" GA-80 (Sumitomo Kagaku Kogyo KK), benzotriazoles including a variety of "Tinuvin" stabilizers (Ciba Specialties), phosphorus chemicals such as "Sumilizer" P-16 (Sumitomo), nitrogen oxide traps such as HN-150 (Nippon Hydrazine), light stabilizers such as "Sumisorb" 300#622 (Sumitomo), hindered amine stabilizers including various "Tinuvin" types, inorganic pigments such as titanium oxide, zinc oxide, and carbon black, metal salts such as magnesium stearate and barium sulfate, hydrotalcite, mixtures of huntite and hydromagnesite, bactericides containing silver, zinc, or compounds thereof, deodorants, a variety of anti-static agents, cerium oxide, and phosphoric acids.

In the process of the present invention, either dry-spinning or melt-spinning can be used to make the spandex. To make polyurethanes for melt-spinning, either melt-polymerization or solution polymerization can be used, and the polymerization can be carried out in one step or two steps. PVDF can be added to the polyurethane as a finely divided solid, and the resulting spinning mixture, optionally containing other additives as described herein, can be melt-spun to form the spandex.

When the spandex of the present invention is to be prepared by dry-spinning, a two-step solution polymerization process can be used, especially for polyurethaneureas. In two-step solution polymerization, the polymeric glycol is contacted with the diisocyanate, the mole ratio ("capping ratio") of diisocyanate to glycol being about 1.5–4.5, to form a mixture of isocyanate-terminated glycol and unreacted diisocyanate which mixture is designated a "capped glycol". The capped glycol is dissolved in a suitable solvent such as dimethylacetamide ("DMAc"), dimethylformamide, dimethylsulfoxide, and N-methyl-pyrrolidone. DMAc is preferred. To the resulting solution of capped glycol is added at least one chain extender and a small amount of chain terminator to form the polyurethane(urea). (For polyurethanes, a one-step solution polymerization process can also be used, in which the polymeric glycol, diisocyanate, and at least one diol chain extender are added to the solvent substantially simultaneously.) Optional stabilizers and pigments can be added to the resulting solution, which has a polyurethane(urea) content of at least 30 weight percent. In the process of the present invention, PVDF and optionally stabilizers, pigments, and the like, can be added and mixed thoroughly into the polymer solution to form a spinning mixture which is a solution. The spinning solution can then be spun through a spinneret into a heated column in which the solvent evaporates from the polymer to form the spandex, which can then be wound up.

When diol-extended polyurethanes are to be made, it can be advantageous to use one or more polymerization catalysts. Typical amine catalysts include N,N-dimethylcyclohexylamine, N,N-dimethyl-benzylamine, triethylamine, N-methylmorpholine, N-ethylmorpholine, N,N,N',N'-tetramethylethylene diamine, N,N,N',N'-tetramethyl-1,3-propane diamine, N,N,N',N'-tetramethylhexane diamine, bis-2-dimethylamino ethyl ether, N,N,N',N',N"-pentamethyldiethylene triamine, tetramethyl guanidine, triethylene diamine, N,N'-dimethyl piperazine, N-methyl-N'-dimethylamino ethyl-piperazine, N-(2-dimethylamino ethyl) morpholine, 1-methyl imidazole, 1,2-dimethyl imidazole, N,N-dimethylamino ethanol, N,N,N'-trimethylamino ethyl ethanol amine, N-methyl-N'-2-hydroxy ethyl (piperazine, 2,4,6-tris (dimethylamino methyl) phenol, N,N-dimethyamino hexanol, and triethanol amine. Organometallic polymerization catalysts include tin octanoate, dibutyltin dilaurate, and dibutyl lead octanoate.

Any suitable equipment can be used for adding and mixing PVDF into the polyurethane(urea) solutions. Typical equipment includes static mixers, stirrers, homogenizers, and screw extruders. PVDF can be added as a solution in the same solvent used to make the polyurethane(urea) solution, or it can be added as a finely divided solid.

In order to attain higher tenacity, the dry-spinning speed is at least 450 meters per minute. In the spandex and process of the present invention, no drop in polyvinylidene fluoride content or yarn discoloration was observed due to the heat experienced in dry spinning.

Percent set and percent stress-relaxation of the spandex of this invention are sensitive to the ratio of the speed of the windup to that of the Godet roll, which is 1.15–1.65. If a high set, low stress-relaxation yarn is desired, the ratio can be 1.15–1.40, preferably 1.15–1.35. If a low set, high stress-relaxation yarn is desired, the ratio can be 1.25–1.65, preferably 1.35–1.65.

The analytical tests used to characterize the spandex prepared in the Examples were performed as follows.

The viscosity of the polyurethane(urea) solutions was determined in accordance with the general method of ASTM D1343-69 with a Model DV-8 Falling Ball Viscometer, (sold by Duratech Corp., Waynesboro, Va.), operated at 40° C. The percent set, percent stress-relaxation, tenacity, and percent elongation were obtained by testing the spandex with an Instron Model 4502 tensile tester.

A 5-cm (length L1) spandex sample was stretched to 300% elongation at a speed of 50 cm/min and then allowed to relax. This cycle was repeated five times. Stress was measured at the end of the fifth stretch and designated G1. The sample was then held at 300% elongation for 30 seconds, after which stress was again measured and designated G2. The percent difference between G1 and G2 was reported as the percent stress relaxation. The sample was then allowed to relax from the fifth stretch until the stress was zero; the length at this point was measured and designated L2. The percent difference between L1 and L2 was reported as the percent set. The sample was stretched a final, sixth time until it broke. The stress at the break was measured, designated the tenacity, and reported in grams. The length at break was also measured and designated L3, and the percent difference between L1 and L3 was reported, as percent elongation. These relationships are further described by the following equations:

$$\% \text{ Stress-relaxation} = 100 \times ((G1)-(G2))/(G1)$$

$$\% \text{ Set} = 100 \times ((L2)-(L1))/(L1)$$

$$\% \text{ Elongation} = 100 \times ((L3)-(L1))/(L1)$$

To determine heat-set (percent), the fiber was treated in a relaxed condition for 10 minutes with 100° C. steam, treated in a relaxed condition for 2 hours with boiling water, and dried at room temperature for one day. The relaxed length was measured and designated L4. The fiber was then extended 100%, treated with 115° C. steam for 1 minute, and subsequently treated with 130° C. air for 1 minute at the same 100% extension. Next, the fiber was left to stand at 100% extension at room temperature for one day. The fiber was then allowed to relax, and the final length (L5) was measured. The percent heat set was calculated from the following equation:

% Heat set=100×((L5)−(L4))/(L4)

To simulate the exposure of spandex to body oils and perspiration, the fiber was held at 100% elongation for 24 hours in a 5% by weight solution of oleic acid in hexane, followed by holding it (still at 100% elongation) for 1 hour in an 0.5% by weight solution of N,N'-diethyl toluamide in ethanol. The fiber was then dried for 24 hours at room temperature in a relaxed condition. Elongation at break of the treated fiber was measured on the sixth extension and designated E1. The ratio of the elongation at break of the treated fiber to the elongation at break of untreated fiber (E2) was used as a measure of chemical resistance.

% Chemical resistance=100×(E1)/(E2)

The amount of PVDF in the spandex was determined analytically as follows. First, a calibration curve was prepared for each type of fiber, as classified by chain extender. One gram of fiber was rinsed with n-hexane and completely dissolved in 50 ml of DMAc to form a polyurethane solution. Then, 100 ml of ethanol was gradually added to precipitate the PVDF, which was filtered from the solution and discarded. The filtered polyurethane solution was evaporated to dryness. DMAc solutions of the residue and 0%, 1%, 3%, 6%, 10%, and 20% by weight of PVDF, based on the total weight of polyurethane and PVDF, were prepared. Films were prepared by casting the solutions and analyzed by Fourier-Transform InfraRed. Ratios ("Xc") of infra-red peak areas at ν (CO) $1700cm^{-1}$–$1800cm^{-1}$ compared to the peak areas at ν ($CF_2$) $890cm^{-1}$ were obtained for each of the films with a Perkin-Elmer FT-IR. A calibration curve, having a slope (α), was prepared by plotting the wt % PVDF content against the peak area ratio (Xc).

To determine the amount of PVDF in a fiber test sample, the fiber was rinsed with n-hexane, dissolved in DMAc, cast into a film and its IR spectrum determined. The ratio (Xs) of the peak area at ν (CO) $1700cm^{-1}$–$1880cm^{-1}$ compared to the peak area at ν ($CF_2$) $890cm^{-1}$ of the spectrum of the film was obtained. The wt % PVDF in the fiber sample was determined by comparing Xs to the calibration curve:

Weight % PVDF=(α)×(Xs)

EXAMPLES

In the Examples, for polyurethanes in which the chain extender was ethylene glycol, the windup speed was 540 m/minute and the ratio of the windup speed to the Godet roll speed was 1.40 (Examples 1, 2, 3, and 4, and Comparative Examples 1 and 2). For polyurethaneureas in which the chain extender was ethylene diamine (Example 5 and Comparative Example 3), the windup speed was 600 m/min, and the winder/Godet speed ratio was 1.20. The windup speed was 600 m/min and the winder/Godet speed ratio was 1.30 for polyurethaneureas in which the chain extender was an 80/20 mole ratio mixture of ethylene diamine and 1,3-cyclohexane diamine (Example 6 and Comparative Example 4). The spandex was 18 denier (20 dTex) in all Examples, and its high-side melting point was 229°–258° C.

"Zokki" style (with spandex in every course) pantyhose was knitted using the spandex of the invention (Examples 1, 2, 3, 4, 5, and 6) which had machine sizes greater than, and wear pressure lower than, those of conventional "Zokki" pantyhose using spandex not of the invention but having the same knitting tension and knit construction. The spandex of the invention produced "Zokki" pantyhose having excellent wear comfort and easy donning and doffing.

Example 1

PO4G having a molecular weight of 2900 (496 grams) and MDI (170 grams, capping ratio 3.97) were stirred together for 2 hours at 80° C. to form a capped glycol. Dry DMAc (1333 ml) was added, and the mixture was stirred to dissolve the capped glycol. Then 2G chain extender (37.87 grams) was added and the resulting mixture was stirred for 6 hours and 60° C., followed by addition of n-butanol chain terminator (14.16 grams). The resulting solution was 35% by weight polyurethane and had a falling ball viscosity ("FBV") of 4000 poise. A 2050-g quantity of the polyurethane solution was mixed with 222 g of a 10 wt % solution of a commercial PVDF, number average molecular weight, 48,000, melt viscosity, 12,000 poise (Kureha Chemical Company, Tokyo, Japan) in DMAc, and the resulting solution was agitated for 2 hours. As stabilizing additives, 11.1 grams of a 2:1 by weight mixture of a condensation polymer of p-cresol with divinyl benzene (described in U.S. Pat. No. 3,553,290) and a polymer of bis(4-isocyanatocyclohexyl) methane with N-t-butyldiethanol-amine (3-t-butyl-3-aza-1, 5-pentanediol) (described in U.S. Pat. No. 3,555,115) were added to the polyurethane/PVDF solution. The resulting solution was agitated for 2 hours and then conventionally dry spun to give a spandex of the invention whose properties are shown in Table I.

Example 2

To 2000 g of a polyurethane solution prepared as in Example 1 was added 216 g of a DMAC solution (10% by weight) of a commercial PVDF (Kureha, number average molecular weight, 72,000, melt viscosity, 47,000 poise), followed by agitation for 2 hours. 11.8 grams of an additive mixture as described in Example 1 was added, and the solution was agitated for another 2 hours. The resulting solution was conventionally dry spun to form a spandex of the invention whose properties are reported in Table I.

Example 3

To 2000 g of a polyurethane solution prepared as described in Example 1 was added 70 g of a DMAC solution (5% by weight) of PVDF used in Example 2, followed by thorough agitation for 8 hours using a homogenizing blender. To the resulting solution was added 10.6 g of an additive mixture as described in Example 1, and the solution was agitated for 2 hours and then conventionally dry-spun to give a spandex of the invention whose properties are shown in Table I.

Example 4

To 2000 g of a polyurethane solution prepared as described in Example 1 was added 1975 g of a DMAc solution (10% by weight) of the same PVDF as was used in Example 2. The solution was agitated for 2 hours, and then 13.5 g of an additive mixture as described in Example 1 was added and mixed thoroughly for another 2 hours. The solution was conventionally dry-spun to obtain a spandex of the invention whose properties are reported in Table I.

Comparative Example 1

To 2000 g of a polyurethane solution prepared as described in Example 1 was added 10.5 g of an additive mixture as described in Example 1, followed by agitation for 2 hours. The solution was then conventionally dry-spun to give a spandex outside of this invention. Properties are shown in Table I.

Comparative Example 2

Into 2000 g of a polyurethane solution prepared as described in Example 1 was added 22 g of polytetrafluoroethylene (PTFE, Teflon® K-10, particle size 0.2 micron, DuPont-Mitsui Fluorochemical Company, Tokyo, Japan) using a homogenizing mixer. 10.8 g of the additive mixture described in Example 1 was added, and the mixture was agitated for 8 hours. The mixture was dry-spun to form a spandex outside of the invention. Properties are also shown in Table I.

stirred for 2 hours. 14.1 g of the additive mixture described in Example 1 was added, followed by agitation for 2 hours. The solution was conventionally dry-spun to give a spandex of the invention whose properties are shown in Table II.

Comparative Example 3

To 2500 g of a polurethaneurea solution prepared as described in Example 5 was added 13.1 g of the additive mixture described in Example 1, followed by agitation of the solution for 2 hours and then conventional dry-spinning to produce a spandex outside of this invention. Properties are given in Table II.

TABLE I

| Example | PVDF (wt %) | Elongation (%) | Tenacity (grams) | Set (%) | Stress-Relaxation (%) | Heat-set (%) | Chemical Resistance (%) |
| --- | --- | --- | --- | --- | --- | --- | --- |
| 1 | 0.5 | 410 | 21 | 30 | 35 | 61 | 72 |
| 2 | 3.0 | 430 | 22 | 33 | 35 | 65 | 85 |
| 3 | 3.0 | 425 | 23 | 32 | 35 | 64 | 87 |
| 4 | 22.0 | 405 | 21 | 44 | 40 | 69 | 88 |
| Comp. 1 | 0.0 | 405 | 20 | 25 | 35 | 55 | 56 |
| Comp. 2 | PTFE: 3.1 | 370 | 17 | 27 | 37 | 52 | 59 |

As can be seen from Table I, the chemical resistance and heat-settability of spandex of this invention are increased over spandex containing no PVDF or even when containing PTFE (but no PVDF), without materially affecting the stress

TABLE II

| Example | PVDF (wt %) | Elongation (%) | Tenacity (grams) | Set (%) | Stress-Relaxation (%) | Heat-set (%) | Chemical Resistance (%) |
| --- | --- | --- | --- | --- | --- | --- | --- |
| 5 | 7.0 | 520 | 28 | 31 | 28 | 45 | 90 |
| Comp. 3 | 0.0 | 490 | 25 | 18 | 28 | 25 | 60 | relaxation. Within the more preferred range of 1–20% by weight of PVDF, percent elongation and tenacity are also improved, and percent set is increased without becoming excessive.

"Zokki" style pantyhose made from the spandex of Examples 1, 2, 3, and 4 were soaked for 24 hours in a hexane solution of oleic acid (5% by weight) followed by washing and drying. A wear test of the treated pantyhose showed that their durability was 1.3 times (1.4 times in the case of Example 4) that of "Zokki" style pantyhose made from the spandex of Comparative Example 1 (outside of this invention).

As can be seen from Table II, tenacity, heat-settability, and chemical resistance of spandex of this invention, based on polyurethaneurea which has been chain extended with ethylene diamine, show unexpected improvement over spandex outside of the invention, containing no PVDF.

Example 6

A capped glycol was prepared from 687 grams of PO4G (1800 molecular weight) and 166 grams MDI (capping ratio 1.74) by mixing for 2 hours at 80° C. Dry DMAc (1625 ml) was added, and the mixture was stirred to dissolve the capped glycol. An 80/20 mole ratio of ethylene diamine (15.12 grams) to 1,3-cyclohexyldiamine (3.78 grams) chain extenders and 2.68 grams diethylamine chain terminator were added, and the mixture was stirred for one hour at 60° C. The resulting solution contained 35% by weight polyurethaneurea, and its FBV was 2900 poise. To 2500 g of this solution was added 155 g of a non-commercial, experimental PVDF powder obtained from Kureha, number aver Example 5

Capped glycol was prepared by mixing 704 grams PO4G (1800 molecular weight) and 155 grams MDI (capping ratio 1.58) for 2 hours at 80° C. Dry DMAc (1625 ml) was added, and the mixture was stirred to dissolve the capped glycol. A mixture of ethylene diamine (13.76 grams) and diethyl amine (2.01 grams) was added, and the mixture was stirred for an additional hour at 60° C. The resulting solution contained 35 wt % polyurethaneurea and had an FBV of 2500 poise. To 2500 g of the polyurethaneurea solution was added 659 g of a DMAc solution (10% by weight) of the same PVDF as used in Example 1, and the solution was age molecular weight 5,000, and the mixture was thoroughly mixed with an homogenizer. To the homogenized solution was added 15.5 g of the additive mixture described in Example 1, followed by agitation for 2 hours. The solution was conventionally dry-spun to provide a spandex of this invention having the properties shown in Table III.

Comparative Example 4

To 2000 g of a polyurethaneurea solution prepared as described in Example 6 was added 13.5 g of the additive mixture described in Example 1, followed by agitation for 2 hours. The resulting solution was conventionally dry-spun to give a spandex outside of the invention. Properties are shown in Table III.

TABLE III

| Example | PVDF (wt %) | Elongation (%) | Tenacity (grams) | Set (%) | Stress-Relaxation (%) | Heat-set (%) | Chemical Resistance (%) |
|---|---|---|---|---|---|---|---|
| 6 | 15.0 | 525 | 25 | 30 | 30 | 60 | 96 |
| Comp. 4 | 0.0 | 500 | 22 | 22 | 30 | 30 | 62 |

As can be seen from Table III, spandex of this invention, based on polyurethaneurea prepared with a mixture of chain extenders and containing PVDF, has improved heat-settability and chemical resistance over a similar spandex outside of this invention which does not contain PVDF.

Pantyhose prepared from the spandex of Example 6 was soaked for 24 hours in a hexane solution of oleic acid (5% by weight) followed by washing and drying. A wear test of the treated pantyhose showed that its durability was 1.2 times that of similarly treated pantyhose made with the spandex outside of this invention (Comparative Example 4).

What is claimed is:

1. A polyurethane-based fiber containing 0.1–25 percent poly(vinylidene fluoride) (PVDF), based on the total weight of polyurethane and PVDF in the fiber.

2. The fiber of claim 1 containing 0.3–15 weight percent poly(vinylidene fluoride).

3. The fiber of claim 1 which is spandex.

4. The spandex of claim 3 wherein the poly(vinylidene fluoride) has a number average molecular weight of 300–300,000 and a melt viscosity at 240° C. of 5,000–50,000 poise.

5. The spandex of claim 3 wherein the spandex is derived from a polymeric glycol selected from the group consisting of polyether, polycarbonate, and polyester glycols, a diisocyanate, and at least one difunctional chain extender selected from the group consisting of ethylene diamine, 1,2-propane diamine, 1,3-propane diamine, 1,3-cyclohexanediamine, 2-methyl-1,5-pentanediamine, 1,3-pentanediamine, 1,3-xylylenediamine, N-methylbis(3-aminopropyl)amine, ethylene glycol, 1,3-propane diol, 1,4-butane diol, 1,2-propane diol, 2,2-dimethyl-1,3-propane diol, 3-methyl-1,5-pentane diol, 1,6-hexane diol, 1,4-bis(β-hydroxy-ethoxy)benzene, and N-methylbis(2-hydroxypropyl)amine.

6. The spandex of claim 5 wherein the polymeric glycol is a polyether selected from the group consisting of poly(tetramethyleneether) glycol and poly(tetramethyleneether-co-3-methyltetramethyleneether) glycol, and the diisocyanate is 1,1'-methylenebis(4-isocyanatobenzene).

7. The spandex of claim 5 wherein the polymeric glycol is a polyester derived from diols selected from the group consisting of ethylene glycol, 2,2-dimethyl-1,3-propane glycol, 1-methyl-1,2-ethane diol, 1,3-propane diol, 1,4-butane diol, 3-methyl-1,5-pentane diol, 1,6-hexane dial, and mixtures thereof, and diacids selected from the group consisting of adipic acid, 1,9-nonanedioic acid, and 1,12-dodecanedioic acid, and the diisocyanate is 1,1'-methylenebis(4-isocyanatobenzene).

8. The spandex of claim 3 containing 0.5–15 weight percent poly(vinylidene difluoride).

9. A process for making polyurethane-based fiber comprising the steps of:

(a) preparing a polymer selected from the group consisting of elastomeric segmented polyurethanes and polyurethaneureas;

(b) adding 0.1–25 weight percent, based on the total weight of polymer and PVDF, of poly(vinylidene fluoride) to the polymer to form a spinning mixture; and (c) spinning the mixture to form the fiber.

10. The process of claim 9 wherein the fiber is spandex.

11. The process of claim 10, wherein the polymer is derived from a polymeric glycol selected from the group consisting of polyether, polycarbonate, and polyester glycols, a diisocyanate, and at least one difunctional chain extender selected from the group consisting of ethylene diamine, 1,2-propane diamine, 1,3-propane diamine, 1,3-cyclohexanediamine, 2-methyl-1,5-pentanediamine, 1,3-pentanediamine, 1,3-xylylenediamine, N-methylbis(3-aminopropyl)amine, ethylene glycol, 1,3-propane dial, 1,4-butane diol, 1,2-propane diol, 2,2-dimethyl-1,3-propane diol, 3-methyl-1,5-pentane diol, 1,6-hexane diol, 1,4-bis(β-hydroxyethoxy)benzene, and N-methylbis(2-hydroxypropyl)amine; wherein the spinning mixture is a spinning solution; and wherein the solution is dry-spun to form spandex.

12. The process of claim 10 wherein the polymer is derived from a polymeric glycol selected from the group consisting of polyether-, polycarbonate-, and polyester glycols, a diisocyanate, and at least one difunctional chain extender selected from the group consisting of ethylene glycol, 1,3-propane diol, 1,4-butane diol, 1,2-propane diol, 2,2-dimethyl-1,3-propane diol, 3-methyl-1,5-pentane diol, 1,6-hexane diol, 1,4-bis(β-hydroxyethoxy)benzene, and N-methylbis(2-hydroxypropyl)amine; wherein the spinning mixture is substantially free of solvent; and wherein the solution is melt-spun to form spandex.

* * * * *